(12) United States Patent
Mercier et al.

(10) Patent No.: US 11,654,065 B2
(45) Date of Patent: May 23, 2023

(54) BRAKE SYSTEM FOR A PATIENT SUPPORT APPARATUS

(71) Applicant: UMANO MEDICAL INC., L'Islet (CA)

(72) Inventors: Gabriel Mercier, Saint-Vallier (CA); Ghislain Demers, Beaumont (CA)

(73) Assignee: UMANO MEDICAL INC., L'Islet (CA)

( * ) Notice: Subject to any disclaimer, the term of this patent is extended or adjusted under 35 U.S.C. 154(b) by 0 days.

(21) Appl. No.: 17/259,700

(22) PCT Filed: Jul. 10, 2019

(86) PCT No.: PCT/IB2019/055883
§ 371 (c)(1),
(2) Date: Jan. 12, 2021

(87) PCT Pub. No.: WO2020/012382
PCT Pub. Date: Jan. 16, 2020

(65) Prior Publication Data
US 2021/0330527 A1 Oct. 28, 2021

Related U.S. Application Data

(60) Provisional application No. 62/697,483, filed on Jul. 13, 2018.

(51) Int. Cl.
*A61G 7/05* (2006.01)
(52) U.S. Cl.
CPC .................. *A61G 7/0528* (2016.11)
(58) Field of Classification Search
CPC .......... A61G 7/00; A61G 7/05; A61G 7/0528; A61G 5/1005; B60B 33/0078
See application file for complete search history.

(56) References Cited

U.S. PATENT DOCUMENTS

| 2007/0170673 A1 | 7/2007 | Figel et al. |
| 2013/0111664 A1* | 5/2013 | Childs .................. A61G 7/0528 |
| | | 280/80.1 |

(Continued)

FOREIGN PATENT DOCUMENTS

| CA | 2778644 A1 | 12/2013 |
| EP | 1349736 B1 | 6/2006 |

(Continued)

OTHER PUBLICATIONS

International Search Report from PCT/IB2019/055883 dated Nov. 19, 2019.
Written Opinion from PCT/IB2019/055883 Nov. 19, 2019.

*Primary Examiner* — Fredrick C Conley
(74) *Attorney, Agent, or Firm* — Steptoe & Johnson LLP; Scott M. Richey (57) ABSTRACT

A brake system for a patient support apparatus including at least one wheel is disclosed. The brake system comprises a braking mechanism to be operatively coupled to at least one wheel of the patient support apparatus. The braking mechanism includes a first coupling portion movable between a lock position for locking the corresponding wheel, and an unlock position for allowing rotation of the wheel. The brake system comprises an actuating tool comprising a second coupling portion complementary to the first coupling portion of the braking mechanism and allowing removably connecting the actuating tool to the braking mechanism of the patient support apparatus. The first and second coupling portions are adapted for allowing engagement between the braking mechanism and the actuating tool to urge the braking mechanism between the lock and unlock positions, and are further adapted for allowing disengagement of the actuating tool from the braking mechanism.

24 Claims, 6 Drawing Sheets

(56) References Cited

U.S. PATENT DOCUMENTS

2013/0318720 A1 12/2013 Connell et al.
2022/0378635 A1* 12/2022 Neihouser ............ A61G 7/0528

FOREIGN PATENT DOCUMENTS

| EP | 3053566 A1 | 8/2016 |
| KR | 10-2010-0045322 A | 5/2010 |
| WO | 2011/126597 A1 | 10/2011 |

* cited by examiner

BRAKE SYSTEM FOR A PATIENT SUPPORT APPARATUS

CLAIM PRIORITY

This application claims the benefit under 35 USC 371 to International Application No. PCT/IB2019/055883, filed Jul. 10, 2019, which claims priority to U.S. Provisional Patent Application No. 62/697,483, filed Jul. 13, 2018, each of which is incorporated by reference in its entirety.

TECHNICAL FIELD

The present invention generally relates to a patient support apparatus such as a healthcare facility bed for example, and more particularly relates to a brake system for a patient support apparatus including one or more wheels for rolling the apparatus from location to location.

BACKGROUND

Patient support apparatuses such as healthcare facility beds are typically designed to be moved from one location to another and are therefore typically provided with a frame mounted on four casters or wheels capable of rotation about two rotation axes, namely a horizontal axis allowing the wheel to roll for moving the bed from one location to another, and a vertical axis allowing the wheel to pivot relative to the frame for steering or orienting the bed during movement.

While it is desirable for the wheels to freely rotate about the horizontal and/or vertical rotation axes during movement of the bed, it becomes desirable to prevent rotation movement of the wheels once the bead has reached a desired location, in order to maintain the bed in a desired position and for prevent any unwanted movement thereof.

To prevent such rotation movement of the wheels, a brake system is typically provided. Such a brake system may include a first brake device for blocking rotation of the wheels about the horizontal axis, as well as a second brake device for preventing the wheels from rotating about the vertical axis.

Figure 1A:
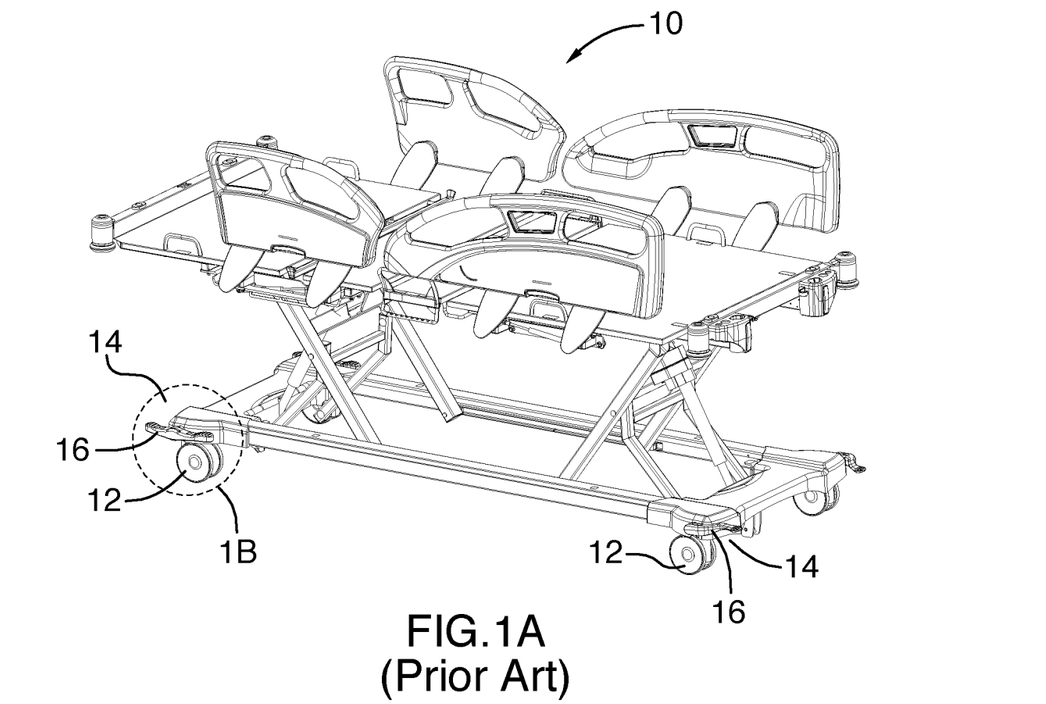
FIG. 1A (PRIOR ART) is a side perspective view of a healthcare facility bed having four wheels, each wheel being equipped with a respective brake system, according to a known embodiment.
Figure 1B:
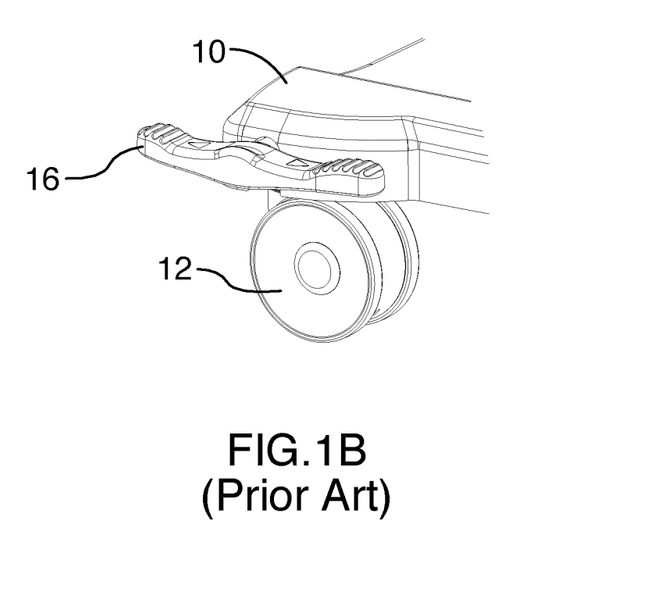
FIG. 1B (PRIOR ART) is an enlarged perspective view of the circled portion of FIG. 1A showing a brake pedal of the brake system.

Taking the prior art bed 10 shown in FIGS. 1A and 1B (PRIOR ART) as an example, the bed 10 may be provided with four wheels 12 and four individual brake systems 14, each being respectively associated with a corresponding wheel 12. In the illustrated bed 10, the brake system 14 includes a brake pedal 16 that can be actuated by a user such as a caregiver to control an internal braking mechanism (not shown) mounted with the corresponding wheel 12, where each brake pedal 16 only applies the brakes to the specific wheel 12 to which it is associated. Prior to moving such a bed, the user must therefore release all four brakes by operating all four pedals 16, and apply all four brakes again by operating all four pedals 16 after the bed 10 has been moved, if the caregiver wants to lock the four wheels 12.

In other beds of the prior art, a same brake pedal can be associated with two wheels such that only one brake pedal has to be operated to simultaneously prevent rotation of two wheels, while in some other beds, the system includes one pedal per wheel and the brakes can be applied simultaneously to all four wheels by operating any one of four pedals. Other known beds can be provided with a single pedal simultaneously engaging the brakes on the four wheels.

Figure 2A:
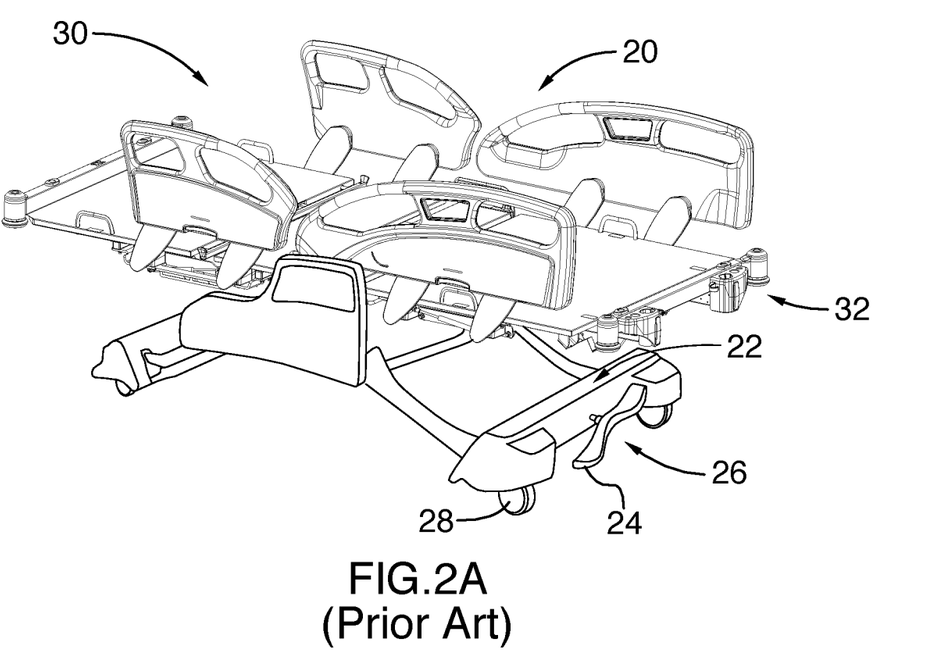
FIG. 2A (PRIOR ART) is a side perspective view of another healthcare facility bed equipped with a brake system, according to another known embodiment.

In some instance, it may be desirable to block rotational movement of one or multiple wheels about a single one of the rotation axes (e.g. the vertical rotation axis) while allowing movement of the wheel about the other rotation axis (e.g. the horizontal rotation axis). As such, the healthcare facility bed may be equipped with a three-position control mechanism to select which of the two rotation axes is blocked. In one example of such bed, shown in FIGS. 2A and 2B (PRIOR ART) a healthcare facility bed 20 is equipped with a typical three-position control mechanism 22 that can be operated through a removable brake pedal 24 of a brake system 26. When the brake pedal 24 is in a BRAKE position, which is illustrated in FIG. 2A, the four associated wheels 28 are simultaneously prevented from rolling about the horizontal axis and swiveling about their vertical axis. The BRAKE position for the brake pedal 24 therefore prevents the bed 20 from moving forwards, backwards or sideways. When the brake pedal 24 is in a NEUTRAL position (not illustrated), the brake pedal 24 extends parallel to the ground, and all wheels 28 are allowed to roll about the horizontal axis and to swivel about the vertical axis. This NEUTRAL mode thus allows the bed 20 to move forwards, backwards or sideways. This mode may be used to maneuver the bed in a tight area. When the brake pedal 24 is in a STEER position, illustrated in FIG. 2B, all wheels 28 are allowed to rotate about their respective horizontal axes, the pair of wheels 28 located proximate the head end 30 of the bed are additionally allowed to swivel around their vertical axes while the pair of wheels 28 located proximate the foot end 32 of the bed are prevented from swiveling about their vertical axes. These latter wheels 28 proximate the foot end 32 of the bed are usually locked in a position parallel to the longitudinal axis of the bed to facilitate keeping the straight movement direction for the personnel transporting patients along hospital corridors. This mode is generally used when attempting to steer the bed in a desired direction.

Figure 2B:
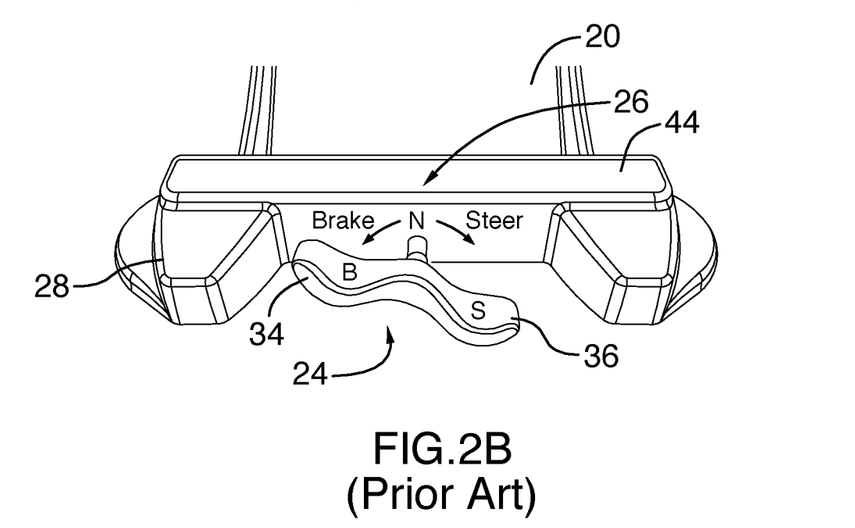
FIG. 2B (PRIOR ART) is an enlarged front perspective view of the brake pedal of the brake system shown in FIG. 2A.

In the illustrated embodiment, the brake pedal 24 can be operated between the three positions by applying pressure on a corresponding end 34, 36 of the pedal 24, as known in the art. Moreover, the brake pedal 24 can be removed from the brake system 26 once the bed has been locked in the desired position to prevent an unauthorized person from moving the bed.

Various other systems have been proposed in the prior art. However, a common disadvantage of most of the known hospital beds is that the patient or staff members may get injured due to unexpected movement of the bed, if the bed has been moved to a desired location and the staff member forgets to apply the brakes after putting the bed at said location.

To reduce the risk of staff members forgetting to apply the brakes in appropriate circumstances, some brake systems are provided with visual indications allowing a visual check of the status of the brake system. For example, in the brake system shown in FIGS. 2A and 2B (PRIOR ART), visual marks on the bed frame 44 and on the brake pedal 24 allow to quickly check the status of the brake system 26.

However, when brake pedals are removable (e.g. the brake pedal 24) and the brake pedal has been removed to prevent an unauthorized use thereof, it is no longer possible to perform a visual check of the status of the brake system (e.g. brake system 26).

Yet, in some health care environments, the use of removable brake pedals tends to be particularly desirable. For instance, when a bed is used for particular mental health care applications, greater consideration tends to be required. For example, it may be desirable to prevent the patient from changing the mode of the brake pedal to prevent risk of falling or injuries. It would also be desirable to prevent the patient from moving the bed to an undesired position such as in front of the chamber door. For at least these reasons, a brake pedal that is removable from the bed appears to be desirable. However, a known disadvantage of these systems is that staff have to actively remove the brake pedal from the bed and some staff members may forget to remove the pedal after use. When a staff member forgets to remove the brake pedal from the bed, the patient may then move the bed, or even use the pedal as a weapon against other patients or staff members.

Moreover, known systems using a removable pedal have shown that a secure installation of the brake pedal may be a complex task. An incorrect installation of the pedal may be possible and may lead to a failing brake system and/or to misinterpretation of the status of the brake system.

It would therefore be desirable to provide an improved brake system for a patient support apparatus, such as a healthcare facility bed, that would reduce at least one of the above-mentioned drawbacks of known brake systems.

SUMMARY

According to a broad aspect, there is provided a brake system for a patient support apparatus including at least one wheel configured for rotation about a horizontal axis and a vertical axis, the brake system. In this broad aspect, the brake system comprises a braking mechanism to be operatively coupled to at least one wheel of the patient support apparatus, the braking mechanism including a first coupling portion movable between a first position for preventing rotation of the at least one wheel about at least one of the horizontal axis and the vertical axis, and a second position for allowing rotation of the at least one wheel about the horizontal axis and the vertical axis. The brake system also comprises an actuating tool comprising a second coupling portion, the second coupling portion being complementary to the first coupling portion of the braking mechanism and allowing removably connecting the actuating tool to the braking mechanism of the patient support apparatus, the first and second coupling portions being adapted for allowing engagement between the braking mechanism and the actuating tool to urge movement of the braking mechanism between the first position and second unlock position.

In one feature, the first and second coupling portions are adapted for allowing engagement between the braking mechanism and the actuating tool to urge movement of the braking mechanism between the first position and the second position upon a pressure of a user on the actuating tool, and the first and second coupling portions are further adapted for allowing disengagement of the actuating tool from the braking mechanism absent pressure by the user.

In another feature, the transverse dimensions of the first coupling portion are greater than the transverse dimensions of the second coupling portion.

In yet another feature, the braking mechanism and the actuating tool are made of plastic.

In still another feature, the first coupling portion is a female coupling portion and the second coupling portion is a male coupling portion.

In a further feature, the first and second coupling portions are flower shaped.

In still a further feature, the patient support apparatus comprises a frame having a first identification mark. In this feature, the braking mechanism further comprises a second identification mark, the first and second identification marks collaborating to indicate the position of the first coupling portion.

In yet a further feature, the actuating tool is comprised of a tubular body.

In an additional feature, the braking mechanism further comprises an outer sleeve rotatably mounted about the first coupling portion.

In yet an additional feature, the patient support apparatus is a bed or a wheelchair.

In another feature, the actuating tool is configured to be operable by a limb of the user.

In yet another feature, when the first coupling is moved to the first position, the rotation of the at least one wheel about the horizontal axis and the vertical axis is prevented.

The brake system of claim 15, wherein the first coupling portion is further movable to a third position for preventing rotation of the at least one wheel about while allowing rotation of the at least one wheel about the horizontal axis.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of examples by which the invention may be practiced. It will be understood that other embodiments may be made without departing from the scope of the invention disclosed.

There is disclosed a brake system for a patient support apparatus including at least one wheel. Throughout the present description, the brake system will be described in conjunction with a healthcare facility bed having four wheels but it should be understood that various other types of patient support apparatus may be considered. Similarly, the number of wheels may vary. For example, the patient support apparatus could be provided with three wheels, or with a single wheel.

As will become apparent upon reading the present description, the present brake system may be used in various applications requiring the use of patient support apparatuses. For example, the present brake system could be used in mental healthcare facilities wherein enhanced security considerations are desirable to protect the patients themselves as well as staff members.

Figure 3:
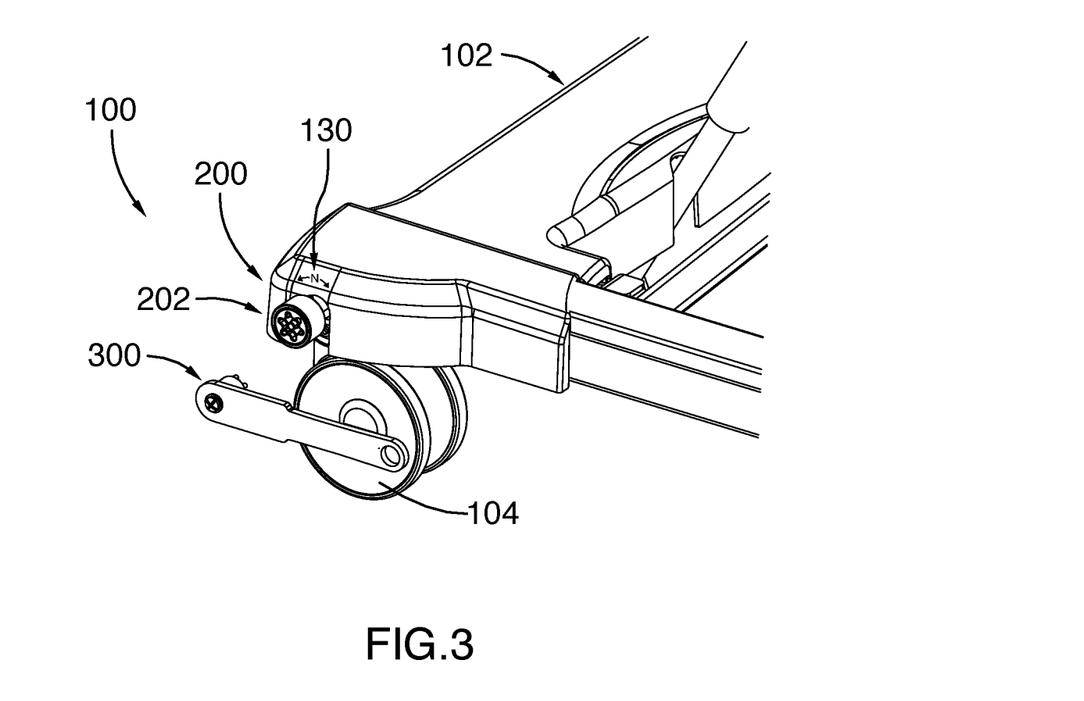
FIG. 3 is a perspective view of a brake system for a patient support apparatus partially mounted on a corresponding wheel thereof, according to one embodiment.

Referring to FIG. 3, there is shown one embodiment of a brake system 100 for a patient support apparatus 102 of which only a portion is illustrated. For example, the brake system 100 may be used on the prior art bed shown in FIG. 1A (PRIOR ART), as detailed below.

The brake system 100 comprises a braking mechanism 200 operatively coupled to at least one corresponding wheel 104 of the patient support apparatus 102, and actuating tool 300 designed to removably couple the braking mechanism 200 for actuating the same, as it will be described in greater detail below. When used on a bed of the type illustrated on FIG. 1A (PRIOR ART), four distinct braking mechanisms 200 may be used, one for each wheel 104, although other arrangements may also be considered. For a non-limiting example, the brake system 100 of the present invention could be adapted to control two or more wheels 104. Moreover, the braking mechanism 200 may be adapted to provide a typical three-position control mechanism as known in the art as well as other arrangements such as a two-position lock/unlock control mechanism.

Still referring to FIG. 3, and referring also to FIGS. 5 to 7, the braking mechanism 200 includes a first outer end 206 for engaging the actuating tool 300 and an opposed inner end 208 devised to receive a shaft (not shown) therein to effect operative connection between the braking mechanism 200 and a braking element (not shown) interacting with the wheel 104, as it will be described in greater detail below.

Moving from the outer end 206 to the inner end 208, the braking mechanism 200 includes a first coupling portion 202, a central elongated portion 204 and a sleeve portion 240 rotatably mounted to the first coupling portion.

Figure 5:
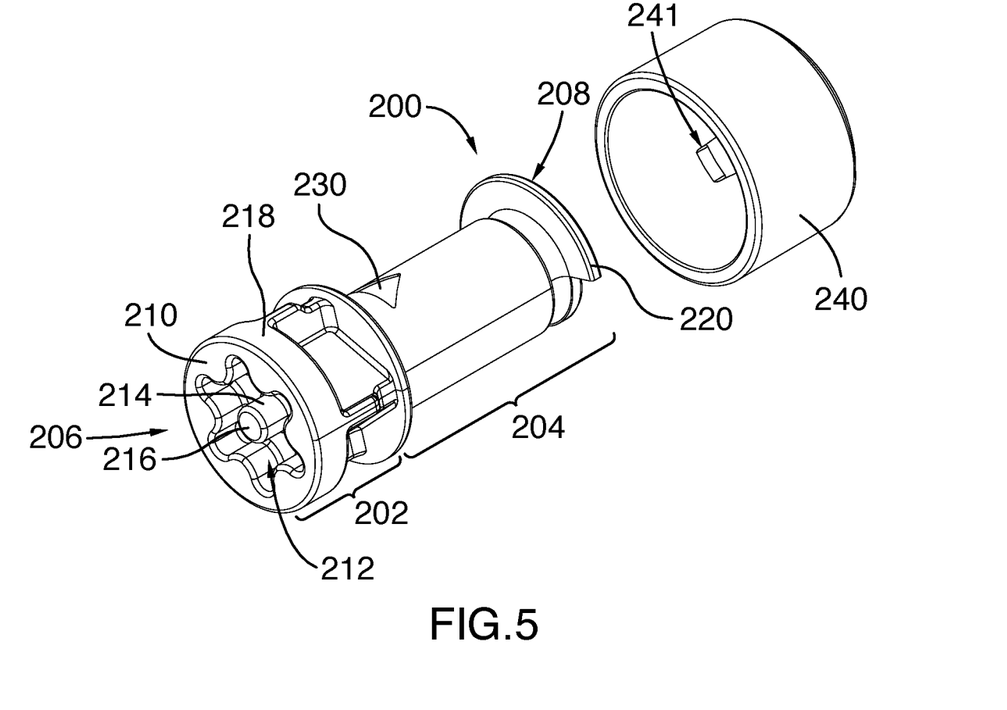
FIG. 5 is an exploded perspective view of a braking mechanism of a brake system, according to one embodiment.

With reference to FIG. 5, the first coupling portion 202 has a flat mating surface 210 provided with somewhat of a flower-shaped recess 212 defined therein, as well as a shaft 214 projecting outwardly from the center of the recess 212. The shaft includes an end 216, the flat mating surface 210 and the end 216 of the shaft 214 being flush with each other.

Still referring to FIG. 5, in one embodiment, the central elongated portion 204 has a generally tubular shape, as illustrated in FIG. 5. The first coupling portion 202 is secured at the first end 206 of the central elongated portion 204. The second end 208 of the central elongated portion 204 is devised to receive a shaft (not shown) therein to effect operative connection between the first coupling portion 202 and a braking element (not shown) interacting with the wheel 104.

Figure 6:
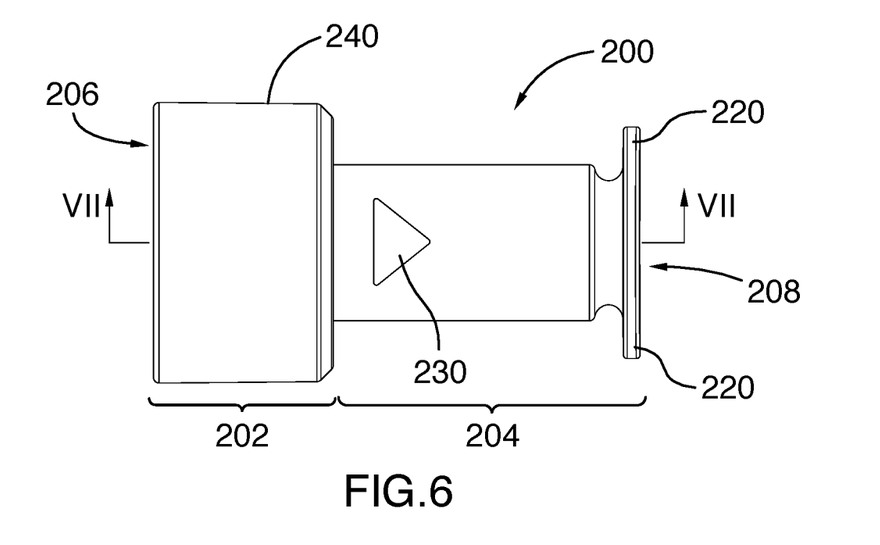
FIG. 6 is a top view of the braking mechanism shown in FIG. 5.
Figure 7:
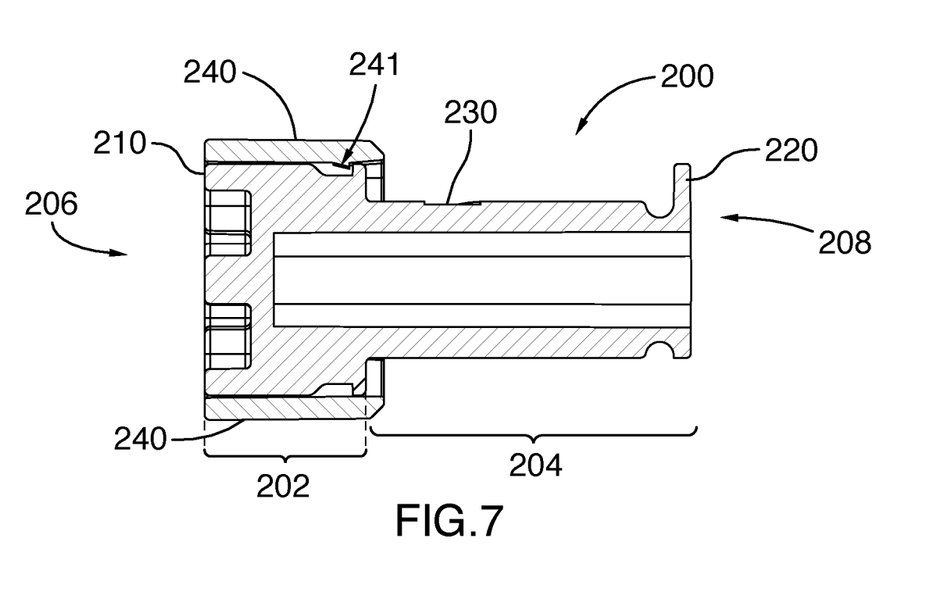
FIG. 7 is a cross-sectional view of the braking mechanism shown in FIG. 6.

As shown in FIGS. 5 and 6, in one embodiment, at the second end 208, the central elongated portion 204 is provided with stop members 220 devised to abut on corresponding facing stop members (not shown) on the frame of the patient support apparatus 102 to restrain the rotational movement of the braking mechanism 200 between the allowed positions. An advantage of such an embodiment may be to help prevent excess pressure being applied on the brake mechanism 200 and may reduce the likelihood of breakdown of any of the brake elements.

Figure 8:
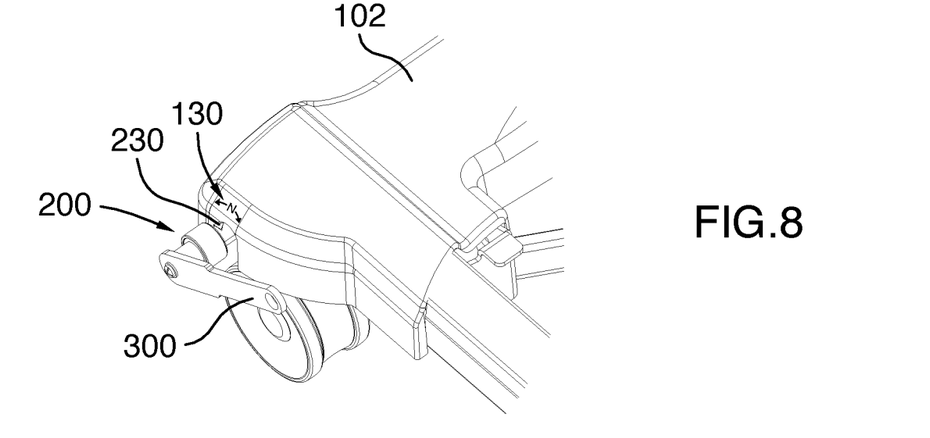
FIG. 8 is a perspective view of the brake system of FIG. 3, the actuating tool being actuated in the unlock position of the braking mechanism.
Figure 9:
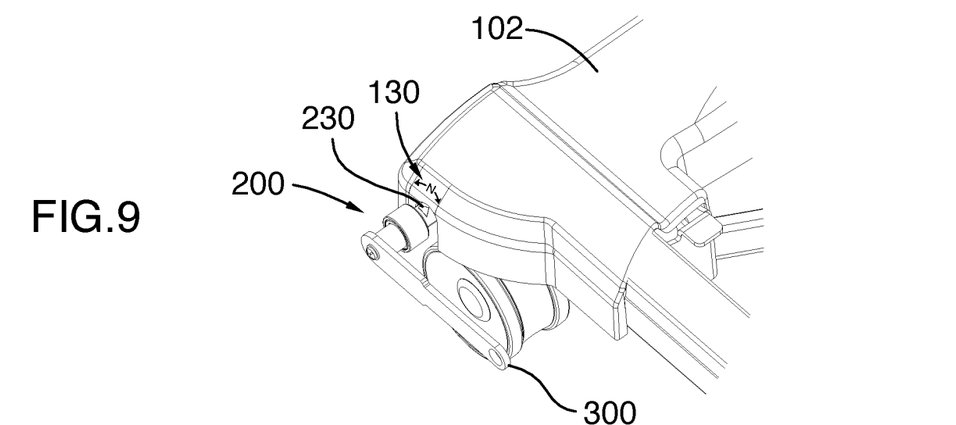
FIG. 9 is a perspective view of the brake system of FIG. 3, the actuating tool being positioned in a steer position of the braking mechanism.
Figure 10:
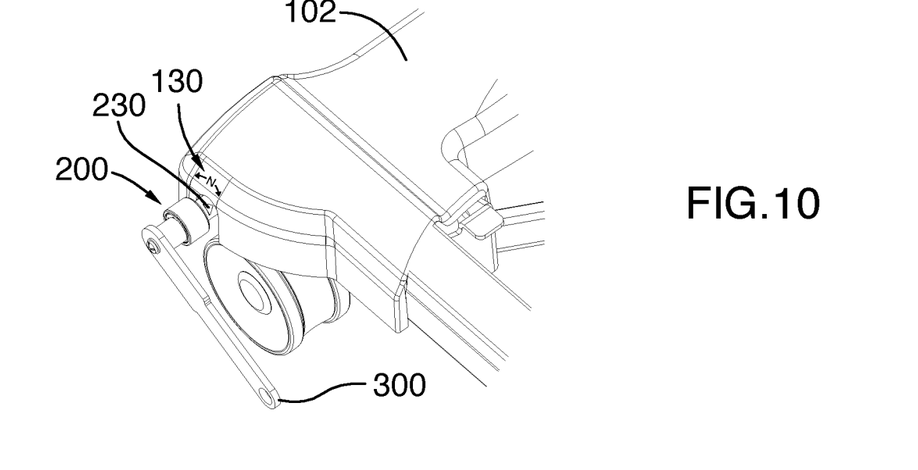
FIG. 10 is a perspective view of the brake system of FIG. 3, the actuating tool being actuated in the lock position of the braking mechanism.

Referring now to FIG. 5 and to FIGS. 8 to 10, in one embodiment, the braking mechanism 200 is further provided with an identification mark 230 affixed on the central elongated portion 204 of the braking mechanism 200. This identification mark 230, in collaboration with a set 130 of other identification marks affixed on the frame of the bed proximate the corresponding wheel 104, enable to quickly check the status of the braking system 100, even if the actuating tool 300 is not in place, which may be of great advantage.

Referring again to FIGS. 5 to 7, in one embodiment, the braking mechanism 200 is further provided with an outer sleeve 240 rotatably mounted around the first coupling portion 202, the outer sleeve 240 being capable of rotation relative to the first coupling portion. In the preferred embodiment, the outer sleeve has a raised portion or tab 241 which rotatably engages with the first coupling portion 202 to maintain the outer sleeve 240 over the first coupling portion 202. This outer sleeve 240 arrangement may be of great advantage for some applications since it prevents an unauthorized operation of the braking mechanism 200, to thereby provide a brake system 100 that may be seen as tamperproof. Indeed, in one embodiment as the one illustrated in FIG. 3, only the outer end 206 and the first coupling portion 202 of the braking mechanism are accessible to a user since the second end 208 and most of the central elongated portion 204 are engaged under a portion of the frame of the bed. The outer end 206 and the first coupling portion 202 of the braking mechanism cannot be operated by hand or with the help of pliers since the rotating outer sleeve 240 prevents access and grip to the outer surface 218 of the first coupling portion 202. Moreover, the first coupling portion 202 being positioned inside the outer sleeve 240, it is designed to be difficult to use, see practically unusable, except with the adapted actuating tool 300. The use of the outer sleeve 240 therefore ensures that the position of the braking mechanism 200 cannot be adjusted without use of the actuating tool 300.

Figure 4:
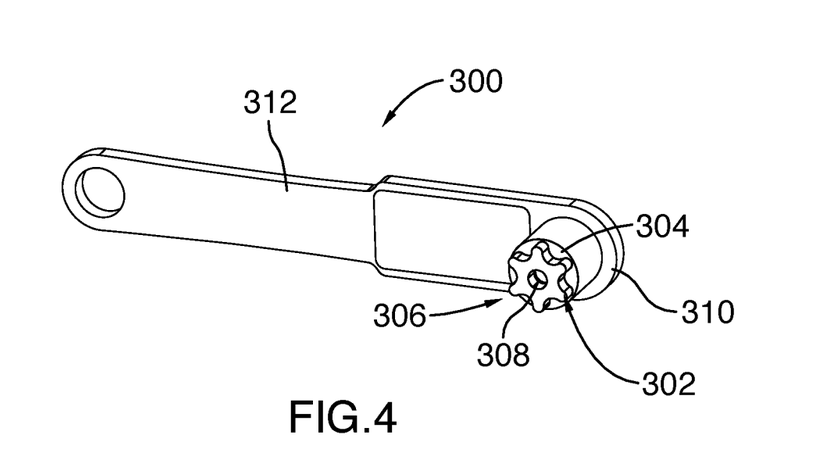
FIG. 4 is a perspective view of an actuating tool of a brake system, according to one embodiment.

Referring now to FIGS. 3 and 4, the actuating tool 300 for actuating the braking mechanism 200 will now be described in accordance with one embodiment. In this embodiment, the actuating tool 300 includes a second coupling portion 302 mounted to an end 310 of an elongated member 312, the second coupling portion 302 being complementary to the first coupling portion 202 of the braking mechanism 200, as it will become apparent below. The elongated member 312 acts as a lever to be operated by hand or as a pedal to be operated by foot, to operate the braking mechanism 200. While in the illustrated embodiment, the second coupling portion 302 is mounted to the end 310 of the elongated member 312, other arrangements may be considered. For example, the second coupling portion 302 of the actuating tool could be mounted to a central portion of the elongated member 312.

As illustrated in FIG. 4, the second coupling portion 302 has a shape that is complementary to the first coupling portion 202 of the braking mechanism 200. In the illustrated embodiment, the second coupling portion 302 is thus a male coupling portion and has a flat mating surface 304 shaped and sized to mate with the corresponding flat mating surface 210 of the female coupling portion 202. The second coupling portion 302 also has a flower-shaped projection 306 projecting outward from the corresponding flat mating surface 304 and devised to fit in the flower-shaped recess 212. A recess 308 is provided in the center of the flower-shaped projection 306 for receiving the shaft 214 of the first coupling portion 202 therein. The recess 308 has a bottom surface that mates with the shaft 214 of the first coupling portion 202. In one embodiment, the shape and size of the recess 308 and the shaft 214 are chosen so that the shaft 214 may snuggly fit into the recess 308 when the male coupling portion 302 is connected to the female coupling portion 202.

In the illustrated embodiment, the flower-shaped recess 212 and the flower-shaped projection 306 are each respectively provided with 6 petals having the same shape. Thus, the actuating tool 300 could be mounted with the braking mechanism 200 in several positions. The skilled addressee will appreciate that such an arrangement provides a fast and easy way to connect the actuating tool 300 to the braking mechanism 200 since a precise single orientation of the actuating tool 300 with respect to the first coupling portion 202 is not required. The skilled addressee will also appreciate that various other configurations of the first and second coupling portions 202, 302 may be considered without departing from the scope of the invention. For example, the recess 308 and the shaft 214 may be omitted. While the present description refers to a 6-petal flower shape for the recess 212 and the projection 306, it should be understood that the recess 212 and the projection 306 may have any other adequate mating shape. For example, the recess 212 and the projection 306 may have a triangular shape, a rectangular shape, a hexagonal shape, etc.

As it is apparent from the present description of FIGS. 3 and 4, the second coupling portion 302 is adapted for allowing a removable connection of the actuating tool 300 to the braking mechanism 200 of the patient support apparatus 102. Such removable connection may be of great advantage for some applications, as detailed below.

In this illustrated embodiment, the first coupling portion 202 of the braking mechanism 200 is a female coupling while the second coupling portion 302 of the actuating tool 300 is a male coupling portion. The person skilled in the art will understand that the male and female coupling portions could be reversed so that the male coupling portion could be located on the braking mechanism 200 and the female coupling portion could be located on the actuating tool 300.

Still referring to FIG. 3 and also to FIGS. 8 to 10 which show the actuating tool 300 engaged with the braking mechanism 200 in a respective position, the first and second coupling portions 202 and 302 are adapted for allowing engagement between the braking mechanism 200 and the actuating tool 300. When the actuating tool 300 is engaged with the braking mechanism 200, i.e. when the projection 306 is inserted into the recess 212, upon manual pressure of a user the braking mechanism 200 is movably urged or rotated between the lock position and the unlock position previously described.

Once the second coupling portion 302 of the actuating tool 300 is engaged in the first coupling portion 202 of the braking mechanism 200, the rotation of the actuating tool 300 in one direction or the other cause a corresponding rotational movement of the first coupling portion 202, as well as of the elongated central portion 204 and the shaft (not show) coupled thereto, to urge the brake of the wheel 104 between a lock position for locking the wheel 104, or an unlock position for allowing rotation of the wheel 104. In one embodiment, when the first coupling portion 202 is in the unlock position, the corresponding wheel 104 is allowed to rotate and swivel, while when the first coupling portion 202 is in the lock position, the wheel 104 is prevented from rotating about its horizontal rotation axis and from swiveling about its vertical rotation axis, as previously described. There may be an additional position allowing rotational movement in the horizontal and vertical axes of two front wheels 104, while only allowing rotation in the horizontal axis in the rear wheels to facilitate steering.

FIGS. 8 to 10 illustrate a braking mechanism 200 adapted for providing a three-position control as previously described, according to one embodiment. This braking mechanism 200 thus allows a lock position and an unlock position, and an additional third position also called the STEER mode. FIG. 8 shows the braking mechanism 200 in the unlock position, FIG. 9 shows the braking mechanism 200 in the STEER position while FIG. 10 shows the braking mechanism 200 in the lock position, as can be shown with the visual triangular mark 230 provided on the braking mechanism 200. As it should be apparent, the user can easily operate the braking mechanism 200 between each position by rotating the actuating tool 300.

As it is apparent from FIGS. 3 and 4, the first and second coupling portions 202 and 302 are further adapted for allowing disengagement of the actuating tool 300 from the braking mechanism 200 absent any pressure by the user, to thereby provide a removable actuating tool 300. This may be of great advantage for preventing unauthorized operation of the braking system 100, as further described below.

Moreover, as it can be understood, a single actuating tool 300 is required to move and/or stabilize the patient support apparatus 102. For moving a bed previously in the lock position, the user has to engage the actuating tool 300 with the braking mechanism 200 to rotate it to the unlock position for each braking mechanism 200, e.g. for the braking mechanism 200 of each wheel. The first and second coupling portions 202, 304 are particularly designed to ease fast engagement of the actuating tool 300 with the braking mechanism 200 without specific positioning constraints. Then, the braking mechanism 200 can be hand-operated in few seconds. An eventual incorrect installation of the actuating tool 300 may not lead to a non-functional or unsafe braking system 100, which may be of great advantage. Moreover, once the braking system 100 has been successfully operated, removal of the actuating tool 300 from the braking mechanism 200 is also very easy thanks to the specially designed first and second coupling portions 202 and 302. In this embodiment, installation, actuation and removal of the actuating tool 300 are all hand-operated for providing a fast and convenient use thereof. The skilled addressee will nevertheless appreciate that various other arrangements may be considered. For example, the actuating tool may be a pedal operable by foot.

As it should now be apparent to the skilled addressee, although the brake system 100 of the invention may be widely used in a great variety of applications, it is particularly well suited for use on healthcare beds or wheelchairs in mental healthcare facilities. Indeed, the present brake system prevents unauthorized operation thereof by an unauthorized person since the brake system cannot be operated without the specially designed actuating tool. The bed can therefore not be displaced by the patient without authorization and remains stable in its position to reduce patient injuries. Moreover, since the actuating tool is removed after use, it cannot be used as a weapon against staff members, as is the case with other prior art designs of actuating pedals. Furthermore, with the identification mark visibly affixed on a part of the brake system that is non removable, visual check of the status of the brake system can be easily performed at all times. The skilled addressee will also appreciate that the present brake system prevents an incorrect installation of the actuation tool with the braking mechanism due to the symmetry of the first and second coupling portions 202, 302, as was the case with some prior art systems.

In one embodiment, the dimensions of the projection 306 that protrudes from the surface 304 of the actuating tool 300 and/or the dimensions of the recess 212 present in the coupling portion 202 are chosen so that the actuation tool 300 automatically disengages from the braking mechanism 200 due to the weight of the actuation tool 300 as soon as the user releases the actuation tool 300. For example, the transverse dimensions of the recess 212 may be greater than those of the projection 306 while still allowing the rotation of the coupling portion 202 when the projection 306 is inserted into the recess 212 and rotated. In the same or another embodiment, the length of the portion of the projection 306 that is insertable into the recess 212 is short enough to allow the automatic disengagement of the actuation tool 300 from the coupling portion upon release of the actuation tool 300 by the user.

As a result, when the user releases the actuation tool 300 while engaged with the coupling portion 202, the actuation tool 300 disengages from the braking mechanism 200 and falls on the ground. Such an embodiment may prevent a user from forgetting the actuation tool 300 since the actuation tool 300 cannot remain engaged with the coupling portion 202 without any human intervention and since a user will see and/or hear the actuation tool 300 fall on the ground.

Although the above description relates to specific preferred embodiments as presently contemplated by the inventors, it will be understood that the invention in its broad aspect includes mechanical and functional equivalents of the elements described herein. For example, although the brake system has been mainly described for use with a healthcare bed, the skilled addressee will nevertheless appreciate that the invention may be used in various other applications.

The invention claimed is:

1. A patient support apparatus comprising a frame, a plurality of wheels each being configured for rotation about a horizontal axis and a vertical axis when the patient support apparatus is moved along a floor by a user, and a brake system comprising:
    a braking mechanism to be operatively coupled one of the plurality of wheels, the braking mechanism comprising an outer end, a first coupling portion extending along a longitudinal axis and an inner end for receiving a shaft to connect the braking mechanism to a braking element interacting with the wheel wherein, in a lock position, rotation of the wheel is prevented, and in an unlock position, rotation of the wheel about the horizontal axis and the vertical axis is allowed;
    an actuating tool comprising an elongated member to be operated by a hand or a foot of the user and a second coupling portion being complementary to the first coupling portion of the braking mechanism, wherein the first and second coupling portions allow removable connection of the actuating tool from the braking mechanism such that the actuating tool is removable by the user from the patient support apparatus, and wherein the first and second coupling portions allow engagement between the actuating tool and the braking mechanism when the actuating tool is connected by the user to the braking mechanism; and
    an outer sleeve rotatably mounted over the first coupling portion;
    wherein, when the second coupling portion is connected to the first coupling portion, the actuating tool is pivotable by the user to a first position to urge movement of the braking mechanism to the lock position and to a second position to urge movement of the braking mechanism to the unlock position; and
    wherein rotatable movement of the outer sleeve with respect to the first coupling portion prevents unauthorized operation of the braking mechanism when the actuating tool is removed from the patient support apparatus.

2. The patient support apparatus of claim 1, wherein the first coupling portion comprises a recess defined by a plurality of inner wall portions of the first coupling portion and wherein the second coupling portion comprises a plurality of outer wall portions shaped and sized to mate with corresponding inner wall portions of the first coupling portion when the actuating tool is connected to the braking mechanism.

3. The patient support apparatus of claim 2, wherein the plurality of inner wall portions and the plurality of outer wall portions define contacting surfaces for snuggly fit together the first and second coupling portions.

4. The patient support apparatus of claim 1, wherein the first coupling portion comprises a flower-shaped recess defined by inner wall portions of the first coupling portion and wherein the second coupling portion comprises a flower-shaped projection adapted to mate with the flower-shaped recess when the actuating tool is connected to the braking mechanism.

5. The patient support apparatus of claim 4, wherein the first coupling portion comprises a shaft extending along the longitudinal axis within the flower-shaped recess and wherein the second coupling portion comprises a recess for receiving the shaft when the second coupling portion is connected to the first coupling portion.

6. The patient support apparatus of claim 1, comprising identification marks on a portion of the frame adjacent the braking mechanism, wherein the braking mechanism comprises an elongated portion extending along the longitudinal axis towards the frame, wherein the elongated portion comprises an identification mark, and wherein a position of the identification mark with respect to the identification marks enables the user to determine whether the braking mechanism is in the lock position or the unlock position when the actuating tool is removed from the patient support apparatus.

7. The patient support apparatus of claim 6, wherein the actuating tool is pivotable by the user to a steer position wherein rotation of the wheel in the horizontal axis is allowed and wherein rotation of the wheel in the vertical axis is prevented.

8. The patient support apparatus of claim 7, wherein the identifications marks comprise the letter N between a left arrow and a right arrow.

9. The patient support apparatus of claim 8, wherein in the unlock position, the identification mark is adjacent the left arrow, wherein in the steer position, the identification mark is adjacent the letter N, and wherein in the lock position, the identification mark is adjacent the right arrow.

10. A patient support apparatus comprising a frame, a plurality of wheels each being configured for rotation about a horizontal axis and a vertical axis when the patient support apparatus is moved along a floor by a user, and a brake system comprising:
    a braking mechanism to be operatively coupled to a wheel of the plurality of wheels, the braking mechanism comprising an outer end, a first coupling portion extending along a longitudinal axis and an inner end for receiving a shaft to connect the braking mechanism to a braking element interacting with the wheel wherein, in a lock position, rotation of the wheel is prevented, and in an unlock position, rotation of the wheel about the horizontal axis and the vertical axis is allowed; and an actuating tool comprising an elongated member to be operated by a hand or a foot of the user and a second coupling portion being complementary to the first coupling portion of the braking mechanism, wherein the first and second coupling portions allow removable connection of the actuating tool from the braking mechanism such that the actuating tool is removable by the user from the patient support apparatus, and wherein the first and second coupling portions allow engagement between the actuating tool and the braking mechanism when the actuating tool is connected by the user to the braking mechanism;

wherein, when the second coupling portion is connected to the first coupling portion, the actuating tool is pivotable by the user to a first position to urge movement of the braking mechanism to the lock position and to a second position to urge movement of the braking mechanism to the unlock position; and wherein the first coupling portion comprises a recess defined by a plurality of inner wall portions of the first coupling portion, wherein the second coupling portion comprises a plurality of outer wall portions shaped and sized to mate with corresponding inner wall portions of the first coupling portion when the actuating tool is connected to the braking mechanism, and wherein the plurality of inner wall portions and the plurality of outer wall portions define contacting surfaces for snuggly fit together the first and second coupling portions.

11. The patient support apparatus of claim 10, wherein the recess is a flower-shaped recess and wherein the plurality of outer wall portions define a flower-shaped projection to mate with the flower-shaped recess when the actuating tool is connected to the braking mechanism.

12. The patient support apparatus of claim 11, wherein the first coupling portion comprises a shaft extending along the longitudinal axis within the flower-shaped recess and wherein the second coupling portion comprises a recess for receiving the shaft when the second coupling portion is connected to the first coupling portion.

13. The patient support apparatus of claim 10, comprising identification marks on a portion of the frame adjacent the braking mechanism, wherein the braking mechanism comprises an elongated portion extending along the longitudinal axis towards the frame, wherein the elongated portion comprises an identification mark, and wherein a position of the identification mark with respect to the identification marks enables the user to determine whether the braking mechanism is in the lock position or the unlock position when the actuating tool is removed from the patient support apparatus.

14. The patient support apparatus of claim 13, wherein the actuating tool is pivotable by the user to a steer position wherein rotation of the wheel in the horizontal axis is allowed and wherein rotation of the wheel in the vertical axis is prevented.

15. The patient support apparatus of claim 14, wherein the identifications marks comprise the letter N between a left arrow and a right arrow.

16. The patient support apparatus of claim 15, wherein in the unlock position, the identification mark is adjacent the left arrow, wherein in the steer position, the identification mark is adjacent the letter N, and wherein in the lock position, the identification mark is adjacent the right arrow.

17. The patient support apparatus of claim 10, comprising an outer sleeve rotatably mounted over the first coupling portion, wherein rotatable movement of the outer sleeve with respect to the first coupling portion prevents unauthorized operation of the braking mechanism when the actuating tool is removed from the patient support apparatus.

18. A patient support apparatus comprising a frame, a plurality of wheels each being configured for rotation about a horizontal axis and a vertical axis when the patient support apparatus is moved along a floor by a user, and a brake system comprising:

a braking mechanism to be operatively coupled to a wheel of the plurality of wheels, the braking mechanism comprising an outer end, a first coupling portion extending along a longitudinal axis and an inner end for receiving a shaft to connect the braking mechanism to a braking element interacting with the wheel wherein, in a lock position, rotation of the wheel is prevented, and in an unlock position, rotation of the wheel about the horizontal axis and the vertical axis is allowed;

an actuating tool comprising an elongated member to be operated by a hand or a foot of the user and a second coupling portion being complementary to the first coupling portion of the braking mechanism, wherein the first and second coupling portions allow removable connection of the actuating tool from the braking mechanism such that the actuating tool is removable by the user from the patient support apparatus, and wherein the first and second coupling portions allow engagement between the actuating tool and the braking mechanism when the actuating tool is connected by the user to the braking mechanism; and identification marks on a portion of the frame adjacent the braking mechanism;

wherein, when the second coupling portion is connected to the first coupling portion, the actuating tool is pivotable by the user to a first position to urge movement of the braking mechanism to the lock position and to a second position to urge movement of the braking mechanism to the unlock position; and wherein the braking mechanism comprises an elongated portion extending along the longitudinal axis towards the frame, wherein the elongated portion comprises an identification mark, and wherein a position of the identification mark with respect to the identification marks enables the user to determine whether the braking mechanism is in the lock position or the unlock position when the actuating tool is removed from the patient support apparatus.

19. The patient support apparatus of claim 18, wherein the actuating tool is pivotable by the user to a steer position wherein rotation of the wheel in the horizontal axis is allowed and wherein rotation of the wheel in the vertical axis is prevented.

20. The patient support apparatus of claim 19, wherein the identifications marks comprise the letter N between a left arrow and a right arrow.

21. The patient support apparatus of claim 20, wherein in the unlock position, the identification mark is adjacent the left arrow, wherein in the steer position, the identification mark is adjacent the letter N, and wherein in the lock position, the identification mark is adjacent the right arrow.

22. The patient support apparatus of claim 18, comprising an outer sleeve rotatably mounted over the first coupling portion, wherein rotatable movement of the outer sleeve with respect to the first coupling portion prevents unauthorized operation of the braking mechanism when the actuating tool is removed from the patient support apparatus.

23. The patient support apparatus of claim 18, wherein the first coupling portion comprises a recess defined by a plurality of inner wall portions of the first coupling portion, wherein the second coupling portion comprises a plurality of outer wall portions shaped and sized to mate with corresponding inner wall portions of the first coupling portion when the actuating tool is connected to the braking mechanism, and wherein the plurality of inner wall portions and the plurality of outer wall portions define contacting surfaces for snuggly fit together the first and second coupling portions.

24. The patient support apparatus of claim 23, wherein the recess is a flower-shaped recess and wherein the plurality of outer wall portions define a flower-shaped projection to mate with the flower-shaped recess when the actuating tool is connected to the braking mechanism.

* * * * *